United States Patent [19]

Shkedi

[11] Patent Number: 4,763,063
[45] Date of Patent: Aug. 9, 1988

[54] COMPACT DIGITAL PRESSURE SENSOR CIRCUITRY

[75] Inventor: Zvi Shkedi, Los Angeles, Calif.

[73] Assignee: Allied-Signal Inc., Morris Township, Morris County, N.J.

[21] Appl. No.: 759,627

[22] Filed: Jul. 26, 1985

[51] Int. Cl.[4] .................... G01R 27/26; G01L 9/12
[52] U.S. Cl. .................... 324/60 CD; 73/708; 331/65; 324/61 R
[58] Field of Search .......... 324/60 CD, 60 C, 61 QS, 324/61 R; 73/718, 724, 708, 780; 364/558; 331/65, 143, 111, DIG. 3

[56] References Cited

U.S. PATENT DOCUMENTS

| | | | |
|---|---|---|---|
| 3,805,149 | 4/1974 | Delapierre | 324/60 C |
| 3,997,801 | 12/1976 | Caron et al. | 331/65 X |
| 4,392,383 | 7/1983 | Baverlen et al. | 331/65 X |
| 4,446,447 | 5/1984 | McNamara | 73/718 X |
| 4,598,381 | 7/1986 | Cucci | 73/708 X |

*Primary Examiner*—Reinhard J. Eisenzopf
*Assistant Examiner*—Jack B. Harvey
*Attorney, Agent, or Firm*—Leslie S. Miller; Albert J. Miller; James W. McFarland

[57] ABSTRACT

A conditioning circuit for use with a pressure transducer is disclosed which provides a digitally readable electronic output signal indicative of capacitance sensed by the pressure transducer. The circuitry of the present invention utilizes an R-C charge/discharge circuit, thereby enabling the circuitry to be substantially more compact than previously utilized L-C circuits. The circuitry is usable with either pressure transducers having a single capacitance or those including a reference capacitance, and the circuitry provides a high resolution, high precision output.

14 Claims, 2 Drawing Sheets

COMPACT DIGITAL PRESSURE SENSOR CIRCUITRY

BACKGROUND OF THE INVENTION

1. Field of the Invention

This invention relates generally to electronic conditioning circuitry used in conjunction with a capacitive pressure transducer which changes capacitance when subjected to changes in pressure supplied to the sensor, and more particularly to a circuit supplying a high resolution digital output for indicating pressure sensed in a highly accurate fashion, with the electronic circuitry being miniaturized to the greatest extent possible to allow installation into a limited space.

2. History of the Art

The need for highly accurate indications of pressure is particularly keen in the avionics field, where measurement of several different pressures is utilized to provide information about aircraft altitude, mach number, indicated air speed, angle of attack, and slip or yaw angle. It is readily appreciated that on both military and commercial aircraft such information derived from sampled pressures must be highly accurate.

A system for measuring such pressures includes three components, the first of which is apparatus such as a pitot tube for measuring a pressure at a location on the exterior of the aircraft, with a pneumatic line leading from the pitot tube to the interior of the aircraft. The second component of such a system is a transducer for converting the pneumatic pressure into an electrical signal, with the transducer typically being a fused quartz type unit having variable capacitance such as that shown in U.S. Pat. No. 3,962,921, to Lips. The third component of the system is electronic circuitry having as an input the variable capacitance from the quartz sensor. Typical circuitry using an L-C oscillation to produce a frequency which is dependent on pressure sensed by the quartz transducer is shown in U.S. Pat. No. 3,790,910, to McCormack.

It will be readily appreciated that it is desirable to provide a digital output from the electronic circuitry since the output will almost certainly be supplied to an onboard digital air-data computer. The McCormack reference uses a number of counters and registers to condition the signal supplied to a digital computer. More recently, in U.S. Pat. No. 4,208,918, to Miyamae, pressure sensor circuitry is shown for providing a digital signal to a counter which then will drive a display through a decoder/driver.

Systems such as those previously described operate quite well and have been commercially successful in the past. However, with the increase in the amount of avionic equipment carried by aircraft in combination with the desire to minimize space requirements and weight of such equipment it is desirable to package the sensor and accompanying electronic circuitry in the smallest possible package. The main limitation on decreasing the size of the fused quartz capacitive sensor and accompanying circuitry is dictated by the design of the circuitry, which is an L-C circuit. As is evident by an examination of the Lips sensor, the inclusion of an inductor is responsible for between 80-90% of the size (and weight) of the sensor itself, since the inductor is typically built into the sensor. It may therefore be appreciated that any circuitry utilizing L-C resonance will be unacceptably large, and it is accordingly evident that a different design in the electronic circuitry is required.

The miniaturized design must retain at least as high a degree of precision as the older L-C design. In addition, it must have good resistance to noise, a high degree of resolution, and long term stability and dependability. The sensor circuitry must also be unsusceptible to variations in stray capacitance emanating from the quartz sensor itself, a common problem. It may therefore be appreciated that a miniature electronic circuit for converting the variable capacitance signal from a quartz transducer into a digitally readable electronic signal having high precision is a highly desirable product.

SUMMARY OF THE INVENTION

The present invention utilizes a charge/discharge circuit to which the variable capacitance of the quartz pressure transducer is connected. The charge/discharge circuit provides as an output a variable frequency pulse train which signal is supplied to a microprocessor through a counting and timing circuit, which may include a divider. The microprocessor provides a high resolution digital output indicative of pressure sensed by the quartz pressure transducer as a function of the variable frequency signal supplied by the charge/discharge circuit.

The present invention utilizes an R-C charge/discharge circuit enabling the circuitry to be considerably more compact than the previously utilized L-C circuitry. As a result, the complete package including the quartz pressure transducer and circuitry is considerably smaller than devices constructed according to previously existing circuit designs. In fact, by using the present invention the circuitry may be conveniently installed on a single hybrid chip.

Since it may also be desirable to include temperature compensation, the preferred embodiment of the present invention includes such compensation by providing an electronic signal indicative of temperature sensed to the microprocessor, which then automatically corrects for temperature variations.

The present invention is adaptable to work with various types of capacitive pressure transducers, including both those with both reference and variable pressure capacitances as well as the more simple sensors with a single variable pressure-sensing capacitance. It is also applicable to other types of pressure transducers producing a variable capacitance, such as ceramic and metallic transducers. It may therefore be appreciated that the present invention may differ from the preferred embodiments illustrated therein, and it is adaptable to virtually any situation utilizing a capacitive pressure transducer.

The present invention is particularly valuable in those applications where a high degree of miniaturization of circuitry is required to enable the electronic package to fit in a small space. Although the present invention is considerably more compact than previously known circuit designs, it is highly accurate and has a high degree of resolution. In addition, the circuitry of the present invention also features long term stability, and does not increase the cost of manufacturing the sensor package. As such, it may be appreciated that it is a highly desirable advance in the art and achieves the above-mentioned distinct advantages over the art without significant disadvantage.

DESCRIPTION OF THE DRAWINGS

These and other advantages of the present invention are best illustrated with reference to the drawings, in which.

DETAILED DESCRIPTION OF THE PREFERRED EMBODIMENT

Figure 1:
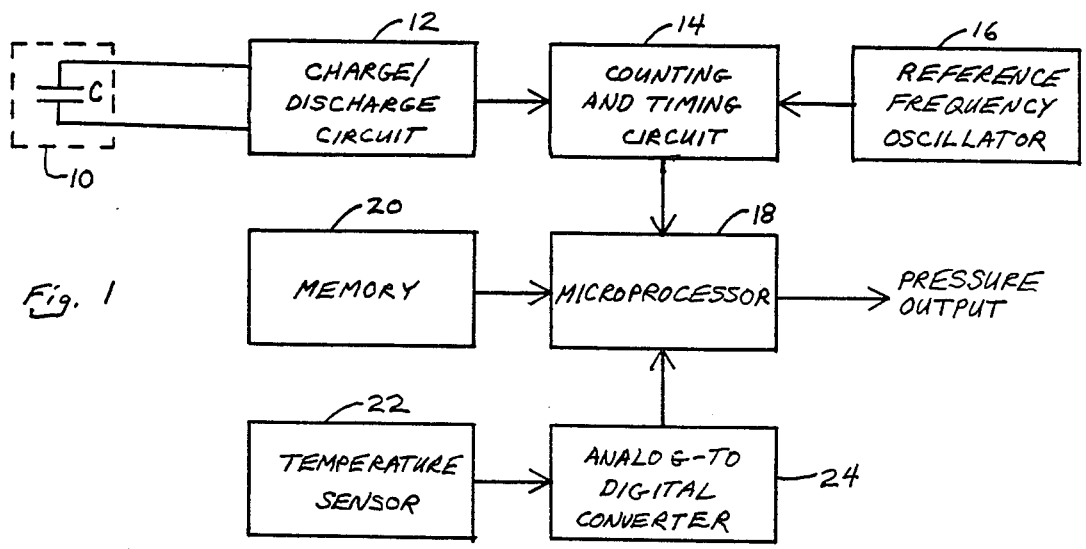
FIG. 1 is a block diagram illustrating the general configuration of the circuitry of the present invention for providing a digital pressure output indicative of pressure sensed by a capacitive pressure transducer.

In FIG. 1 a pressure transducer 10 is illustrated schematically, which pressure transducer 10 typically has a capacitance which, for example, varies from 50–100 pf as the pressure acting on the pressure transducer 10 varies. The capacitance C of the pressure transducer 10 is connected to a charge/discharge circuit 12 which, as its name suggests, operates by charging and discharging the capacitor C. The time period at which the capacitor C is charged and discharged will depend on the capacitance C, and the output of the charge/discharge circuit 12 therefore will be a pulse train typically having a time period of approximately 10–20 microseconds for the example used herein.

The pulse train from the charge/discharge circuit 12 is supplied to a counting and timing circuit 14, as is a reference frequency supplied from a reference frequency oscillator 16. The reference frequency supplied by the reference frequency oscillator 16 may vary from 10–80 MHz and is typically 20 MHz.

The counting and timing circuit 14 may be made from commercially available counter chips, and the design of such counting and timing circuits is well known in the art. The counting and timing circuit 14 may also include a divider, which serves to convert the pulse train from the charge/discharge circuit 12 to a digital value output.

The output from the counting and timing circuit 14 is supplied to a microprocessor 18, which accesses a memory 20 which has a large number of values stored therein according to the variable(s) supplied to the microprocessor 18. In the simplest embodiment the microprocessor 18 would utilize the single input from the counting and timing circuit 14 to provide a digital pressure output. This digital pressure output is a high resolution output, typically from 16–20 bits resolution. By using 16 bits of resolution the output may vary from 0 to 64K.

In the preferred embodiment it may also be desirable to make compensation for temperature changes, so a temperature sensor 22 is provided which temperature sensor provides an analog output indicative of temperature sensed. This analog temperature indication is supplied to an analog-to-digital converter 24, which converts the analog temperature indication to a digital indication and supplies this digital temperature information to the microprocessor 18. The microprocessor 18 then has two inputs, one from the counting and timing circuit 14, and the other from the analog-to-digital converter 24, and utilizes a mathematical formula to provide the digital pressure output. It is apparent from FIG. 1 that this digital pressure output is a function of both the number of pulses supplied from the counting and timing circuit 14 and the temperature sensed by the temperature sensor 22.

Figure 3:
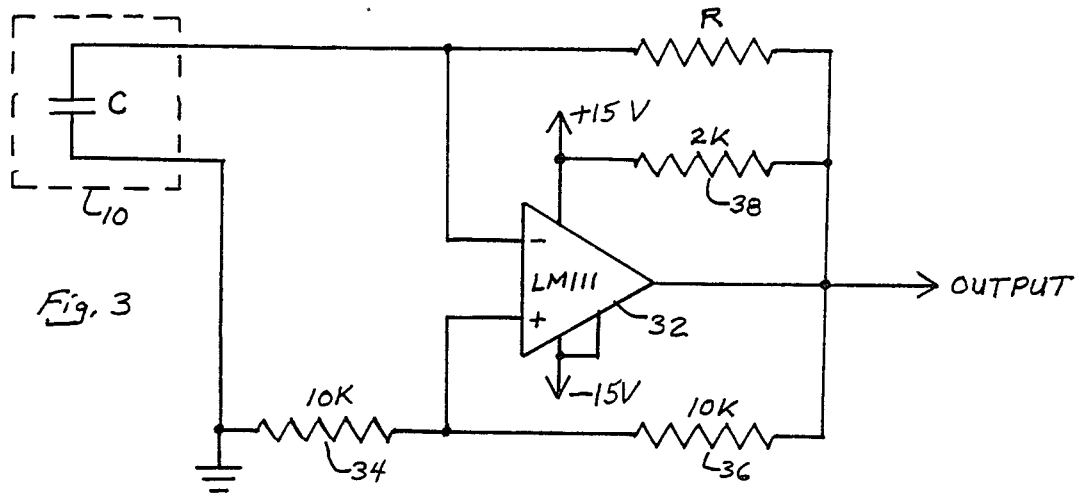
FIG. 3 is an alternate embodiment of the charge/discharge circuit shown in FIG. 1.
Figure 2:
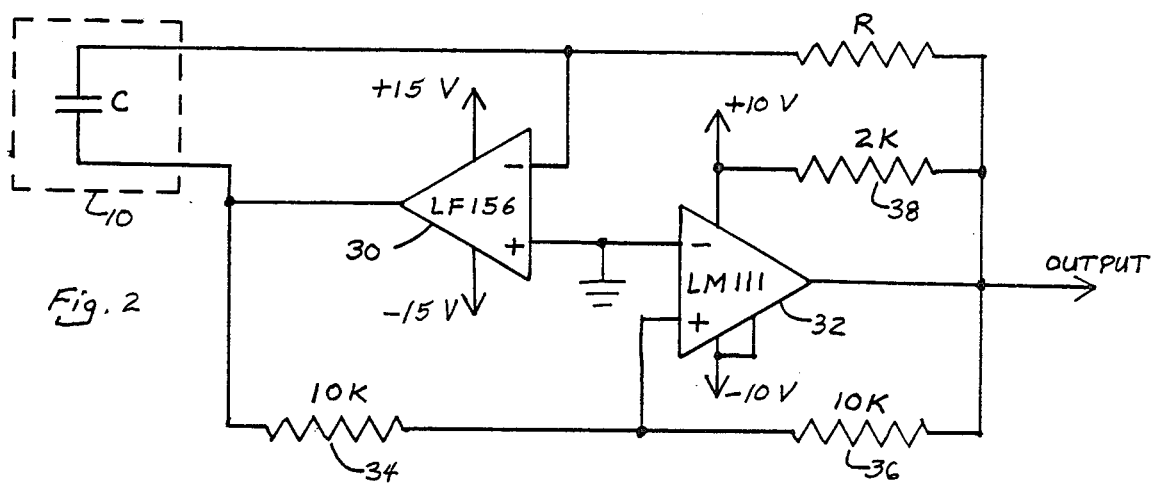
FIG. 2 is the preferred embodiment of the charge/discharge circuit of the present invention shown in FIG. 1.

The heart of the present invention is shown in FIGS. 2 and 3, which are circuitry for the charge/discharge circuit 12, and are highly miniaturized when compared with the prior art. In the preferred embodiment shown in FIG. 2, an operational amplifier 30 and a comparator 32 are utilized together with four resistors. The operational amplifier in the preferred embodiment is a LF156 operational amplifier, which is commercially available, and which is supplied with +15 V power supplies. The comparator 32 is preferably an LM111 comparator, which is also commercially available, and which in the embodiment shown in FIG. 2 is supplied with +10 V power supplies. The four resistors are a first 10K resistor 34, a second 10K resistor 36, a 2K resistor 38, and a resistor R, the value of which may be adjusted to vary the time period of the output of the circuit shown in FIG. 2.

One side of the capacitor C of the pressure transducer 10 is connected to both the inverting input of the operational amp 30 and one side of the resistor R. The other side of the capacitor C is connected to both the output of the operational amp 30 and one side of the 10K resistor 34. The other side of the 10K resistor 34 is connected to both the noninverting input of the caparator 32 and one side of the 10K resistor 36. The noninverting input of the operational amplifier 30 and the inverting input of the comparator 32 are tied together and grounded. The other end of the 10K resistor 36 is connected to the output of the comparator 32, which provides the output for the circuit shown in FIG. 2. The 2K resistor 38 is connected on one side to the output of the comparator 32 and on the other side to the +10 V power supply to the comparator 32. Finally, the other end of the resistor R is connected to the output of the comparator 32.

In the preferred embodiment, the value of the resistor R is approximately 100K ohms, which value will provide a time period in the output of the circuit of approximately 10–20 microseconds.

The circuit shown in FIG. 2 thus acts to charge and discharge the capacitance C of the pressure transducer 10, with the value of the capacitance C and the resistance R controlling the frequency of the output of the circuit shown in FIG. 2. As the capacitance C varies between 50 and 100 pf, the output of the circuit will vary approximately from a 10 to a 20 microsecond time period.

It may be appreciated by an examination of the circuit of FIG. 2 that it does not contain an inductor, and thus has a substantially smaller size than previous circuitry since the physical size of a resistor is substantially smaller than the physical size of an inductor. The circuit shown in FIG. 2 is also quite unsusceptible to stray capacitance occurring around the pressure transducer 10. The circuitry of FIG. 2 also provides excellent long term stability, making its application appropriate even in hostile environments. Finally, the circuitry of FIG. 2 has fairly good resolution, and is therefore applicable in circuitry in which high resolution is not critical.

An alternate embodiment of the circuit of FIG. 2 is illustrated in FIG. 3. The capacitance C of the pressure transducer 10 is again used as the input, with the circuit of FIG. 3 including only the comparator 32 and the four resistors 34, 36, 38, and R. In the circuit of FIG. 3, the comparator 32 is again of the LM111 type, but instead has +15 V power supplies. One side of the capacitor C is connected to both the inverting input of the comparator 32 and one side of the resistance R. The other side of the capacitance C is grounded and connected to the 10K resistor 34. The other side of the 10K resistor 34 is connected to both the noninverting input of the comparator 32 and to one side of the 10K resistor 36. The other side of the 10K resistor 36 is connected to the output of the comparator 32, which again is the output of the circuit of FIG. 3. The 2K resistor is connected to both the +15 V power supply and the output of the comparator 32. Finally, the other side of the resistance R is supplied to the output of the comparator 32.

The circuitry of FIG. 3 is cheaper to construct than the circuitry of FIG. 2, and will also be slightly more compact since it has fewer parts. The value for the resistance R in FIG. 3 is also approximately 100K ohms, which with the typical capacitance C mentioned above will provide an output time period of approximately 10-20 microseconds. The circuit of FIG. 3 is not susceptible to noise and offers a substantially higher resolution than the circuit of FIG. 2, the resolution of the circuit of FIG. 3 being approximately four times higher than the circuitry of FIG. 2. The disadvantage of the circuit of FIG. 3 is that it is not as stable over a long term over the circuit of FIG. 2.

Figure 4:
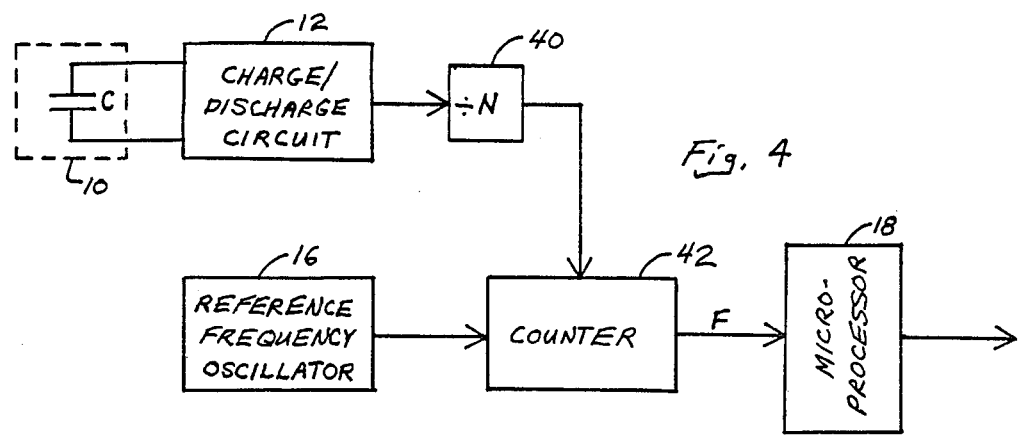
FIG. 4 is a block diagram indicating the application of the present invention to a pressure transducer having a single capacitance.

Referring now to FIG. 4, an abbreviated block diagram is shown which does not illustrate the memory 20, the temperature sensor 22, and the analog-to-digital converter 24, all of which are shown in FIG. 1. The charge/discharge circuit 12 of FIG. 4 may be either of the circuits shown in FIGS. 2 and 3. Since, as previously mentioned, the output of the charge/discharge circuit 12 is a fairly high frequency, it is desirable to use a divider 40 to lower the frequency of the output supplied by the charge/discharge circuit 12. In the preferred embodiment, the divider 40 will skip or divide by 256. The output from the divider 40 is then supplied to a counter 42, which also has as an input a reference frequency from the reference frequency oscillator 16. The counter supplies a digital signal to the microprocessor 18, which will utilize a mathematical formula to provide a digitally readable electronic signal output representing the pressure sensed by the pressure transducer 10. The formula used by the microprocessor 18 in FIG. 4 is of the form $P = K \times F + B$, where K and B are constants and F is the output supplied from the counter 42 to the microprocessor 18.

The configuration shown in FIG. 2 offers high resolution at a fairly low cost. The disadvantage of the configuration illustrated in FIG. 4 is that it is somewhat sensitive to acceleration and turbulence, and in such situations may provide an erroneous output.

Figure 5:
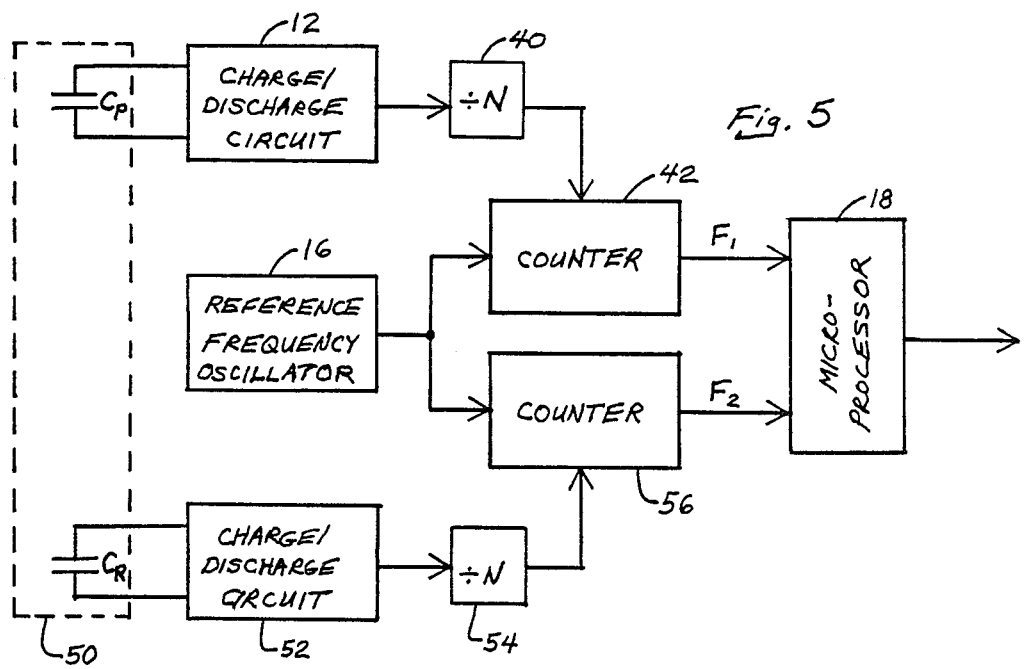
FIG. 5 is a block diagram indicating the application of the present invention to a pressure transducer having both a pressure sensing capacitance and reference capacitance.

Accordingly, the circuitry in FIG. 5 has been designed to supply a high precision as well as high resolution output, even in situations in which acceleration or turbulence are a factor. In FIG. 5 a pressure transducer 50 is illustrated which has two capacitances, namely a first capacitance $C_P$ which is the capacitance which indicates pressure sensed, and the second capacitance $C_R$, which is a reference capacitance. Both $C_P$ and $C_R$ will change identically according to acceleration or turbulence, and hence the changes occurring through the capacitance $C_R$ may be substracted from the changes occurring to the capacitance $C_P$ to determine a true pressure reading.

The capacitance $C_p$ is connected to a charge/discharge circuit 12, which provides an output to a divider 40, which divider 40 provides an output to a counter 42. The counter 42 has a reference frequency input from the reference frequency oscillator 16, and the counter 42 supplies an output to the microprocessor 18. A second charge/discharge circuit 52 has as an output the capacitance $C_R$, and provides an output to a divider 54. The divider 54 provides an output to a second counter 56, which also has as an input the reference frequency oscillator 16. The second counter 56 provides an output to the microprocessor 18. The microprocessor 18 utilizes a more complex mathematical formula in FIG. 5, since it has two inputs from which the output is a function of.

As indicated by FIG. 1, it may be desirable to take differing temperatures into account when computing pressure. Accordingly, the circuit of FIG. 5 would use a formula to compute pressure while taking into account temperature.

It will be appreciated that various combinations of the circuits shown in FIGS. 2 and 3 may be used with the circuits shown in FIGS. 4 and 5. Depending on which criteria are the most important, for the optimal output one of the circuits of FIGS. 2 and 3 would be used with the circuits shown in FIG. 5. It may therefore be appreciated that the present invention is a highly accurate pressure indicator circuit presenting a number of significant advantages over the art. The first and perhaps foremost of these advantages is the greatly reduced size of the present circuit made possible by the R-C circuitry illustrated in FIGS. 2 and 3. While greatly reducing the size, the high degree of accuracy is retained by these circuits, and the cost of manufacturing the circuitry of the present invention is not greater than the cost of manufacturing systems known in the prior art, and may in fact be significantly less than such systems. For these reasons, the present invention provides a highly advantageous circuit possessing unique advantages over the known art.

While the above description provides specific examples illustrating the application of the circuitry of the present invention, it will be appreciated by those skilled in the art that the invention is not limited to these examples. Accordingly, all those modifications variations, or equivalent arrangements apparent to those skilled in the art are considered to be within the scope of the present invention.

What is claimed is:

1. Apparatus for converting a capacitance C generated by a pressure transducer and varying as a function of pressure supplied to said pressure transducer to a digital output indicative of said pressure supplied to said pressure transducer, comprising:

means for charging and discharging said capacitance C, said charging and discharging means combining with said capacitance C to produce an R-C network, said charging and discharging means producing a pulse train having a time period determined by the value of said capacitance C, said charging and discharging means comprising a comparator having as an output said pulse train, an operational amplifier having its noninverting input grounded and connected to said comparator, a first resistor connected at one end thereof to both one side of said capacitance C and the output of said operational amplifier and at the other end thereof to the noninverting input of said comparator, a second resistor connected at one end thereof to the noninverting input of said comparator and at the other end thereof to the output of said comparator, a third resistor connected at one end to the positive power supply of said comparator and at the other end thereof to said output of said comparator, a fourth resistor connected at one end thereof to both the other side of said capacitance C and the inverting input of said operational amplifier and at the other end thereof to said output of said comparator;

means for periodically calculating a digital value representing said time period and thereby characterizing said value of said capacitance C; and means for periodically converting said digital value into a digital output which digital output represents the pressure supplied to said transducer which produces said value of said capacitance C characterized by said digital value.

2. Apparatus as defined in claim 1, wherein the power supplied to said comparator is +10 V, the power supplied to said operational amplifier is +15 V, said first resistor is 10K, said second resistor is 10K, said third resistor is 2K, and said fourth resistor has a value R and combines with said capacitance C to form said R-C network.

3. Apparatus as defined in claim 2, wherein R is 100K ohms.

4. Apparatus as defined in claim 1, wherein said comparator is an LM111 comparator.

5. Apparatus as defined in claim 1, wherein said operational amplifier is an LF156 operational amplifier.

6. Apparatus as defined in claim 1, in which said calculating means comprises:
means for generating a reference frequency; and
means for counting and timing having as inputs said pulse train from said charging and discharging means and said reference frequency.

7. Apparatus as defined in claim 6, wherein said counting and timing means comprises:
a divider for skipping or dividing the number of pulses in said pulse train; and
a counter utilizing said reference frequency and the output from said divider to calculate said digital value representing said time period and thereby characterizing said value of said capacitance C.

8. Apparatus as defined in claim 6, wherein said reference frequency varies between 10 and 80 MHz.

9. Apparatus as defined in claim 8, wherein said reference frequency is approximately 20 MHz.

10. Apparatus as defined in claim 1, in which said conventing means comprises:
memory means for storing a plurality of digital outputs representing particular values of said pressure supplied to said transducer and indicated by particular digital values from said calculating means; and
microprocessor means, operating in conjunction with said memory means, for supplying said digital output representing said pressure supplied to said transducer in response to said digital value supplied from said calculating means to said microprocessor means.

11. Apparatus as defined in claim 1, wherein said digital output is between 16 and 30 bits resolution.

12. Apparatus as defined in claim 1, additionally comprising:
second means for charging and discharging a reference cpacitance $C_R$, said second charging and discharging means combining with said capacitance $C_R$ to produce a second R-C network, said second charging and discharging means producing a second pulse train having a second time period determined by the value of said capacitance $C_R$;
second means for periodically calculating a second digital valve representing said second time period and thereby characterizing said value of said capacitance $C_R$ and wherein said converting means utilizes both said digital value and said second digital value to produce said digital output, said apparatus thereby producing a digital output without errors caused by acceleration or vibration.

13. Apparatus as defined in claim 1, additionally comprising:
means for providing a digital compensation signal to compensate for error caused by temperature changes to said converting means, said converting means utilizing both said digital value and said digital compensation signal to produce said digital output, said apparatus thereby producing a digital output without errors caused by temperature changes.

14. Apparatus as defined in claim 13, in which said providing means comprises:
a temperature sensor for providing an electrical analog signal representing temperature; and
an analog-to-digital converter for converting said electrical analog signal into said digital compensation signal.

* * * * *